US005844763A

United States Patent [19]

Grace et al.

[11] Patent Number: 5,844,763

[45] Date of Patent: Dec. 1, 1998

[54] ELECTRICAL OUTLET ASSEMBLY HAVING FIELD REPLACEABLE TRANSIENT VOLTAGE SURGE SUPPRESSION MODULE

[75] Inventors: Daniel R. Grace, Cromwell; William Ashline, Bristol; Carlos Valente, East Windsor, all of Conn.

[73] Assignee: The Wiremold Company, Hartford, Conn.

[21] Appl. No.: 785,479

[22] Filed: Jan. 17, 1997

[51] Int. Cl.[6] ...... H02H 3/22

[52] U.S. Cl. ...... 361/111; 361/118; 439/652

[58] Field of Search ...... 361/111, 117–118, 361/126–127, 91, 56; 439/651–652; 307/149, 150, 154–156

[56] References Cited

U.S. PATENT DOCUMENTS

| | | | |
|---|---|---|---|
| 1,716,834 | 6/1929 | Nichols | 439/652 |
| 2,277,216 | 3/1942 | Epstein | 333/181 |
| 3,579,175 | 5/1971 | Shroyer | 439/651 |
| 4,217,619 | 8/1980 | Tibolla | 361/156 |
| 4,554,609 | 11/1985 | Ruehl et al. | 361/119 |
| 4,584,622 | 4/1986 | Crosby et al. | 361/56 |
| 4,659,161 | 4/1987 | Holcomb | 439/490 |
| 4,775,802 | 10/1988 | Dods | 307/147 |
| 4,930,047 | 5/1990 | Peterson | 361/395 |
| 5,071,367 | 12/1991 | Luu | 439/501 |
| 5,334,033 | 8/1994 | Milan | 439/214 |
| 5,418,328 | 5/1995 | Nadeau | 174/48 |
| 5,579,201 | 11/1996 | Karageozian | 361/119 |
| 5,658,158 | 8/1997 | Milan | 439/214 |

*Primary Examiner*—Jeffrey A. Gaffin
*Assistant Examiner*—Michael J. Sherry
*Attorney, Agent, or Firm*—McCormick, Paulding & Huber

[57] ABSTRACT

An electrical power outlet assembly having a housing supporting a plurality of electrical outlets each including an electrical plug receptacle. One of the outlets defines a pocket containing a portion of the casing of a field replaceable transient voltage surge suppression module (TVSS). The TVSS module is supported on the outlet assembly housing in plugging engagement with the plug receptacle of the one outlet which defines the pocket.

33 Claims, 3 Drawing Sheets

ELECTRICAL OUTLET ASSEMBLY HAVING FIELD REPLACEABLE TRANSIENT VOLTAGE SURGE SUPPRESSION MODULE

BACKGROUND OF THE INVENTION

This invention relates in general to electrical outlet assemblies and deals more particularly with improvements in multiple electrical power outlet assemblies of the type which include replaceable transient voltage surge suppression devices.

Multi-outlet units and systems of the type with which the present invention is concerned are particularly adapted for use in transient environments to protect electrical devices having voltage sensitive components against the risk of damage from voltage surges, as is well known in the electrical art. The surge suppression devices used with such multi-outlet units and systems are adapted to absorb and dissipate transient voltage surges and require occasional replacement.

Heretofore multiple power outlet assemblies, such as surface mounted raceway systems and cord terminated multi-outlet units for point-of-use applications, have been provided with replaceable surge protection devices. Although such protective devices are designed to be replaced, replacement of the protective device often requires some degree of rewiring. Most replaceable devices require housing entry to effect surge suppressor replacement which may expose a person making the replacement to a potential electrical shock hazard, particularly with respect to a hard-wired system where power interruption is an essential prerequisite to safe servicing of the system. Further, if some rewiring of the system is required to replace an inoperative surge suppressor, there is a risk that improper wiring may be introduced into the system during repair.

If the protected multiple outlet device is of a type having outlet receptacles which continue to function after the associated surge protection device becomes inoperative the outlet device may be allowed to remain in service in the absence of transient voltage surge protection. The risk of this occurrence generally increases as the degree of difficulty required to replace the defective protective device increases.

It is the general aim of the present invention to provide an improved multiple outlet receptacle assembly having a field replaceable transient voltage surge suppression module which may be easily and rapidly replaced, when necessary, without disturbing the wiring associated with the outlet assembly. A further aim of the invention is to provide an improved surge suppression module for plug-in replacements in a multiple-outlet assembly, but which cannot be inadvertently plugged into an electrical receptacle with which it is not intended to be used.

SUMMARY OF THE INVENTION

In accordance with the present invention, there is provided an improved electrical power outlet assembly having a field replaceable transient voltage surge suppression module. The electrical power outlet assembly has a hollow housing supporting a plurality of electrical outlets, each including at least one electrical plug receptacle, and circuit means for electrically connecting one of the outlets to a source of electrical power to provide electrical power at the one outlet and at each of the other of the outlets which comprise the assembly. The housing has an opening therein generally adjacent the one outlet. The transient voltage surge suppression module has a casing including a casing body and a casing cover, a portion of which is offset relative to the casing body. Surge suppressing means contained within the casing body is electrically connected to an electrical plug mounted on the offset portion of the casing cover. The casing body extends through the opening in the housing and is concealed within the outlet assembly housing when the electrical plug is engaged within the one outlet.

DETAILED DESCRIPTION OF PREFERRED EMBODIMENTS

Figure 1:
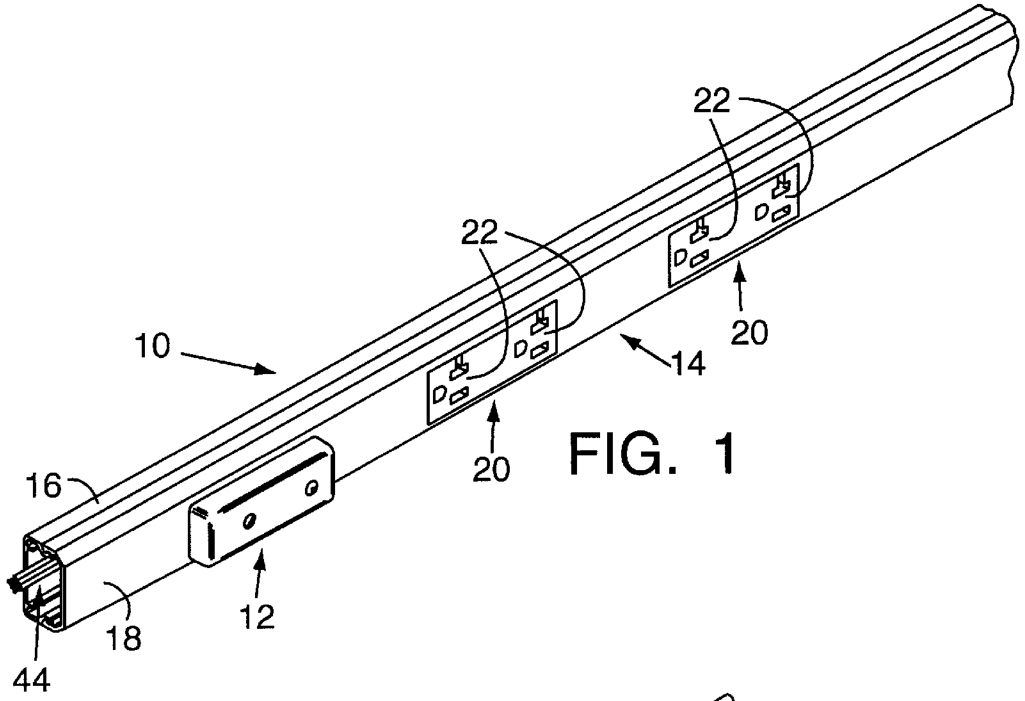
FIG. 1 is a perspective view of a multi-outlet surface raceway system having a field replaceable transient voltage surge suppression module and embodying the present invention.
Figure 2:
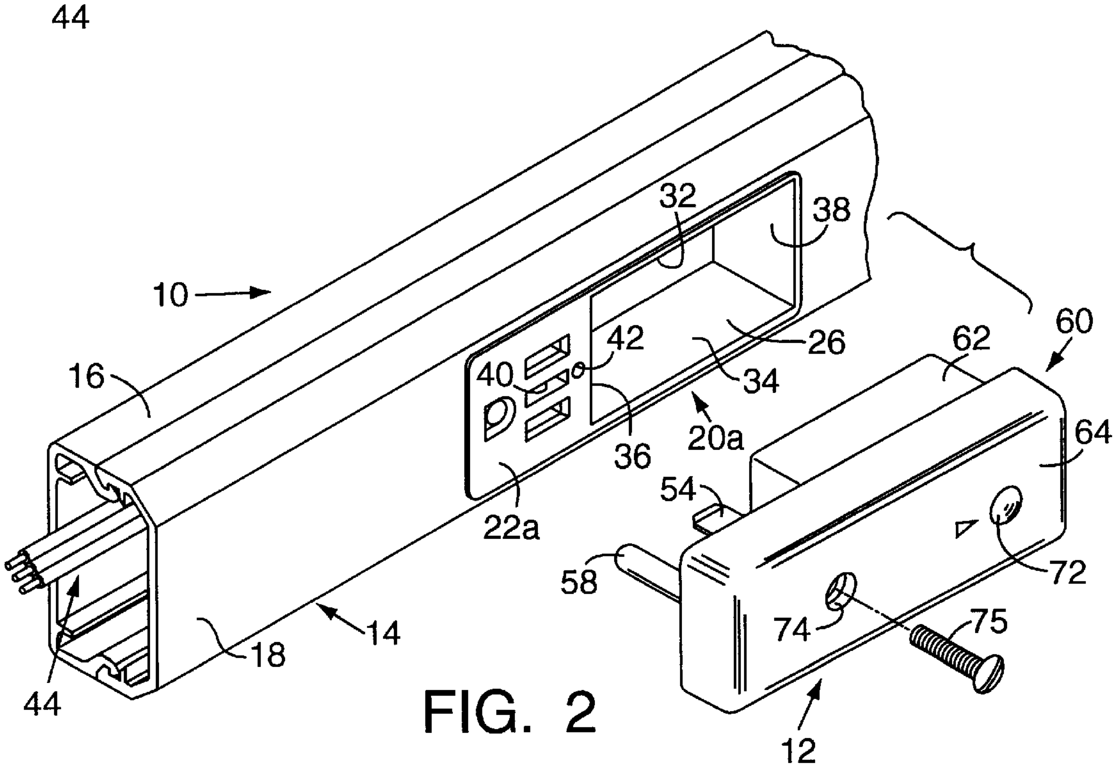
FIG. 2 is a somewhat enlarged fragmentary exploded perspective view of the multi-outlet surface raceway system and surge suppression module of FIG. 1.

Turning now to the drawings and referring first particularly to FIGS. 1 and 2, an electrical power outlet assembly embodying the present invention and indicated generally be the reference numeral 10 includes a field replaceable transient voltage surge suppression module (TVSS) designated generally by the reference numeral 12. The illustrated outlet assembly 10 essentially comprises a modified multi-outlet surface raceway system of a type manufactured and marketed by The Wiremold Company, West Hartford, Connecticut, assignee of the present invention, and includes an elongated hollow housing indicated generally at 14.

In accordance with presently preferred construction, the housing 14 is formed from a non-metallic material and includes a housing base 16 and a housing cover 18 constructed and arranged for snap together assembly with the housing base 16. The cover 18 supports an in-line array of electrical power outlets, indicated generally at 20, 20 (two shown) and mounted within pre-punched openings in the housing cover. Each power outlet 20 has at least one electrical receptacle 22 accessible externally of the housing. However, in accordance with presently preferred raceway construction the raceway 10 includes a plurality of conventional duplex outlets 20, 20, each of having a pair of electrical receptacles, 22, 22, and a modified duplex outlet indicated generally at 20*a* and having a single electrical receptacle as best shown in FIG. 2. The modified outlet 20*a* cooperates with the raceway housing 14 to define a pocket 26 for receiving a part of the surge suppression module 12 therein, as will be hereinafter further discussed.

Figure 3:
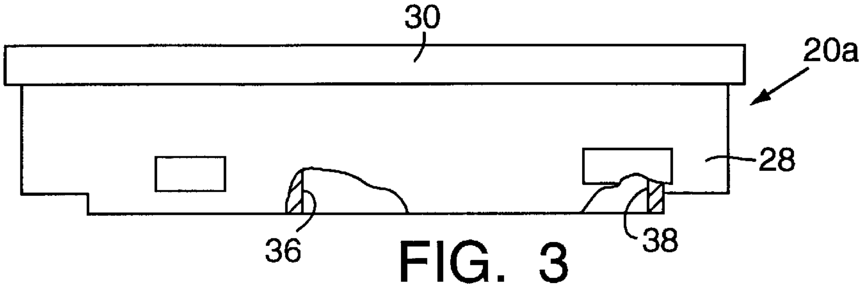
FIG. 3 is a top plan view of the modified duplex outlet shown in FIG. 2.
Figure 4:
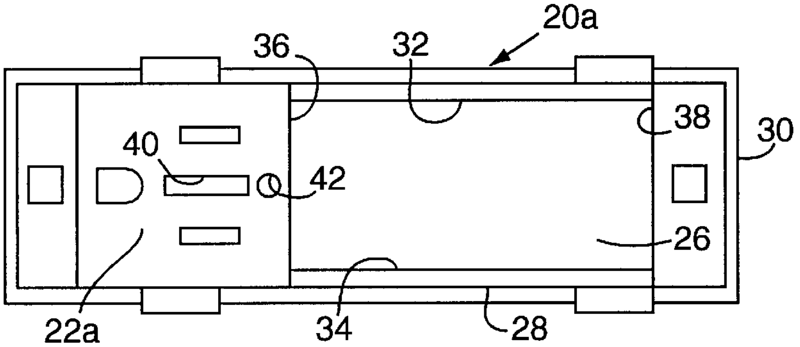
FIG. 4 is a front elevational view of the modified duplex electrical outlet shown in FIG. 2.

The modified outlet 20*a*, further shown in FIGS. 3 and 4, is preferably molded from a durable dielectric plastic material and includes an outlet body 28 and a rear cover, indicated at 30, for snap on assembly with the outlet body 28. The single electrical receptacle 22*a* defined by the body 28 contains conventional electrical receptacle contacts (not shown). A frame formed by the body 28 immediately adjacent the receptacle 22*a* has a top wall 32, a bottom wall 34 and end walls 36 and 38 which cooperate with the outlet cover 30 to define the generally rectangular pocket 26 which opens outwardly through the cover. The illustrated receptacle 22*a* is particularly adapted to receive the plugging elements or prongs on a conventional 110 volt grounded electrical connector. However, other plug receptacle configurations are contemplated within the scope of the invention. The receptacle 22*a* is modified in that it also includes a central slot 40 and a fastener receiving opening 42 for purposes which will be hereinafter further discussed.

A prewired electrical harness, shown in FIG. 2 and indicated generally at 44, forms a part of an electrical circuit for connecting the outlet 20*a* to a source of electrical power (not shown) to provide power at the outlet 20*a* and at each of the other of the outlets 20, 20 which comprise the multi-outlet raceway assembly 10 and it is for this reason that the modified outlet 20*a* is preferably located at a position on the housing 14 where it may be conveniently connected in circuit between the source of electrical power and the other of the outlets 20, 20 which comprise the assembly.

Figure 5:
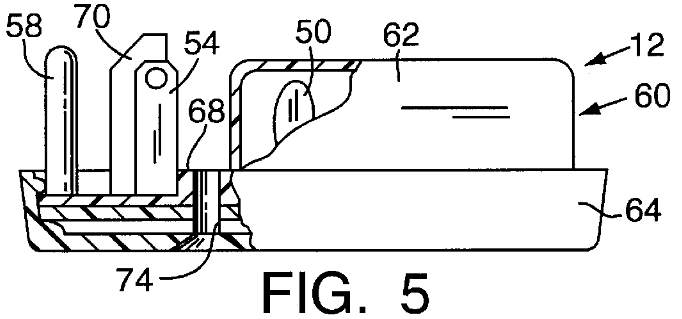
FIG. 5 is a top plan view of the surge suppression module shown in FIGS. 1 and 2.
Figure 6:
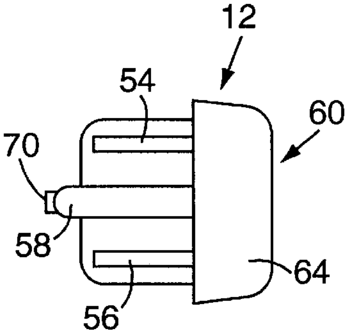
FIG. 6 is an end view of the surge suppression module shown in FIG. 5.
Figure 7:
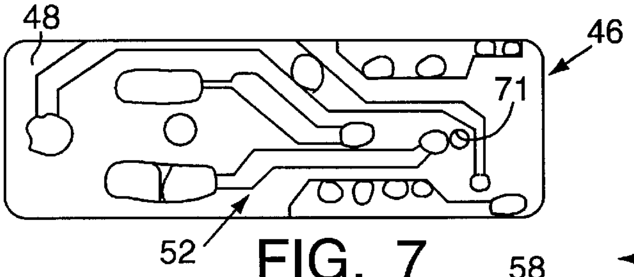
FIG. 7 is a front elevational view of the circuit board assembly.
Figure 9:
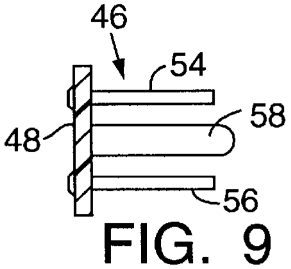
FIG. 9 is a sectional view taken along the line 9, 9 of FIG. 8.
Figure 8:
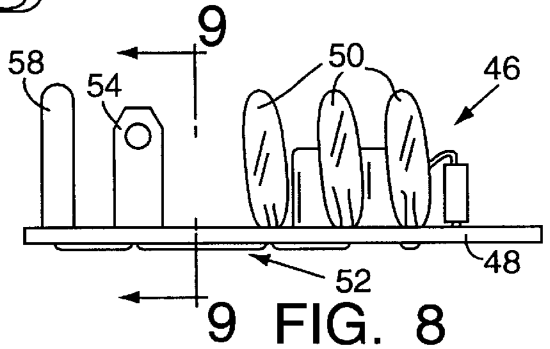
FIG. 8 is a top plan view of the circuit board assembly.
Figure 10:
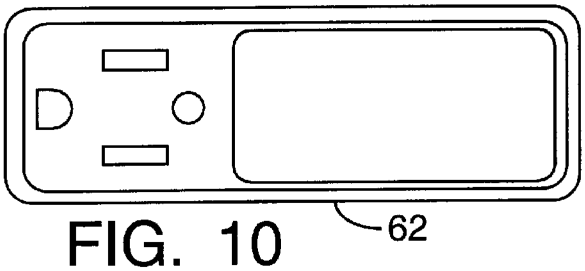
FIG. 10 is a front elevational view of the casing body.
Figure 11:
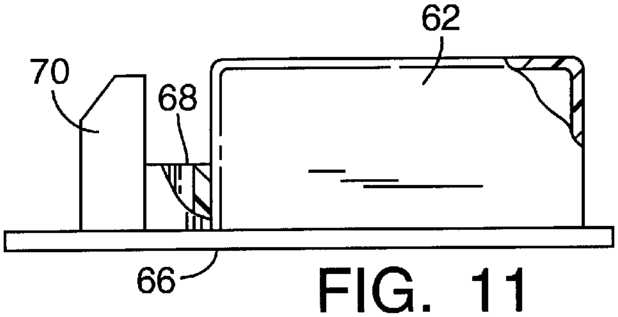
FIG. 11 is a top plan view of the casing body.
Figure 12:
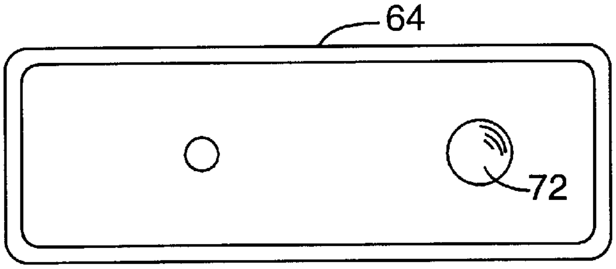
FIG. 12 is a rear view of the casing cover.

Considering now the field replaceable transient voltage surge suppression module (TVSS) 12 in further detail, and referring particularly to FIGS. 5 and 6, the TVSS essentially comprises a circuit board assembly indicated generally at 46 which includes printed circuit board 48 having a plurality of electronic components including metal oxide varistors (MOVs) 50, 50 mounted on its rear surface for absorbing and dissipating transient voltage surges. Electrically conductive traces on the frontal surface of the circuit board as shown in FIG. 7 and indicated generally by the reference numeral 52, electrically connect the MOVs 50, 50 and the other components which comprise the surge suppressing means to a plurality of male plugging elements 54, 56, and 58, which project rearwardly from the circuit board in laterally spaced relation to the latter circuit components. The illustrated plugging elements 54, 56 and 58 exemplify the type of plug used with the receptacle 22*a*, however, it should be understood that other plug configurations are contemplated. The type of plug employed will generally be determined by the nature of the outlet assembly to be protected.

The circuit board 48 and the various electronic components mounted thereon are contained within a casing indicated generally at 60. The casing is preferably molded from a durable dielectric plastic material having the same color as the housing 14 and includes a body 62 and a cover 64. The casing body 62 is generally rectangular, contains the MOVs 50, 50 and the various other electronic components which comprise the surge suppressing means. The casing body 62 is sized to be received within the pocket 26 and has an integral lip 66 extending laterally outwardly from it. The lip 66 is apertured to receive the plugging elements 54, 56 and 58 therethrough. An apertured boss 68 projects rearwardly from the lip 66 and provides support and reinforcement for a rearwardly extending blade-like member as blade 70 integrally formed on the casing for purposes to be hereinafter further evident.

The casing cover 64 is mounted on the casing body and cooperates with the circuit board 48 to provide an envelope for the circuit traces 52, 52 on the circuit board. An indicator signal lamp or LED 71 is mounted on the circuit board 48 and is exposed at the frontal surface of the circuit board (FIG. 7) in alignment with a lens 72 mounted in an opening through the casing cover and best shown in FIG. 2. A fastener receiving opening 74 extends throughout the casing cover 64 and is aligned with the aperture in the boss 68 when the cover is properly positioned on the casing body 62.

Various means may be employed for retaining the casing cover 64 in assembly with the casing body 62. Thus, for example, the casing cover may be arranged for snap together assembly with the casing body. However, since the TVSS 12 is intended to be disposable, the casing cover 64 is preferably permanently secured to the casing body 62, as for example, by a suitable adhesive or by an ultrasonic welding process.

The TVSS 12 is connected to the power outlet assembly 10 in plugging engagement with the receptacle 22*a* with the blade 70 in plugging engagement within the slot 40 and the casing body 62 received and substantially contained within the pocket 26. The TVSS is attached to the outlet assembly 10 by a threaded fastener 75 which passes through the fastener receiving opening 74 and through the boss 68 and threadably engages the threaded opening 42 in the outlet 20*a*. The boss 68 serves as a standoff and engages the front face of the receptacle to prevent overtightening of the fastener 75.

The TVSS 12 is designed to provide protection in all modes; line-to-neutral, line-to-ground and neutral-to-ground. It is designed to absorb and dissipate transient voltage surges and have a long life expectancy under normal operating conditions in a transient environment. However, the TVSS will not normally survive a nearby lightening strike which may be encountered during a severe electrical storm. Occasional replacement of the TVSS will be required. A lighted condition of the lamp or LED 71 visible through the lens 72 indicates that the various outlets 20, 20 are energized and that the TVSS 12 is in operative condition. The absence of an indicating signal at the lens 72 when the assembly 10 is connected to a power source and should be in an energized state indicates that the TVSS is inoperative and requires replacement.

An inoperative TVSS 12 may be easily and rapidly replaced by simply removing the fastener 75, unplugging the inoperative TVSS, replacing it with an operative one of like kind and replacing the fastener 75 which attaches the TVSS 12 to the outlet assembly 10. The blade 70 on the TVSS serves as a disabling member for preventing the TVSS 12 from being misused or erroneously plugged into a receptacle with which it is not intended to be used. Thus, the slot 40 serves as an enabling means for allowing the TVSS 12 to be plugged into a proper receptacle with which it is intended for use.

The insulated conductors which comprise the electrical harness 44 may pass through the pocket 26, preferably adjacent the inner end wall of the rear cover 30. However, it should be noted that the pocket 26 is substantially isolated from the interior of the hollow housing 14 so that a tool or other electrically conductive instrument inserted into the pocket 26 through the opening in the housing cover cannot make contact with a source of electrical energy within the housing when the various outlets which comprise the assembly are energized.

When the TVSS is plugged into an associated multiple outlet assembly it presents a low profile. Further, since the TVSS is color matched to the housing it provides an overall pleasing appearance and does not detract from the decor of the surroundings.

Figure 13:
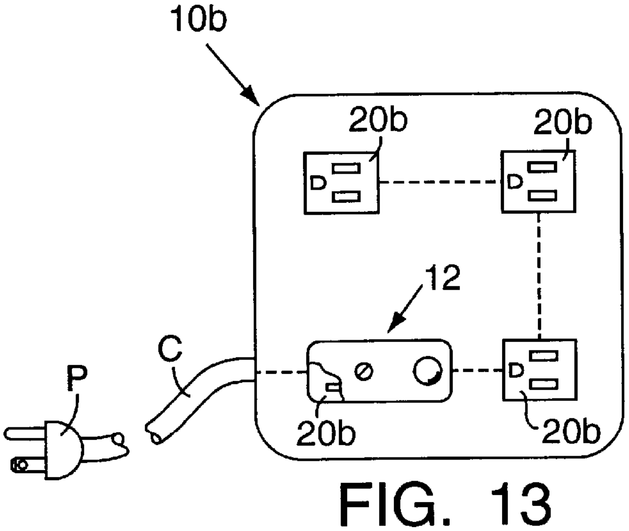
FIG. 13 is a front elevational view of a cord ended multi-outlet assembly embodying the present invention.
Figure 14:
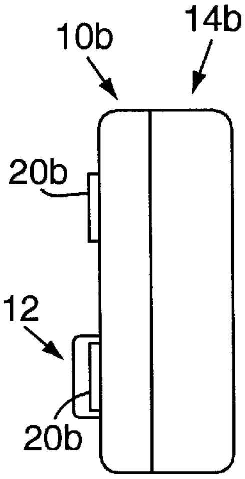
FIG. 14 is an end elevational view of the multi-outlet assembly shown in FIG. 12.

Further referring to the drawings, in FIGS. 13 and 14 there is shown another multiple outlet assembly embodying the invention and indicated generally by the reference numeral 10*b*. The illustrated assembly 10*b* comprises a cord ended point-of-use multiple outlet unit having a housing 14*b* and a replaceable TVSS 12. The multi-outlet assembly 10*b* differs from the previously described outlet assembly 10 in that the housing 14*b* is generally rectangular. Further, the various conventional duplex outlets 20*b*, 20*b* and the modified duplex outlet to which the TVSS 12 is connected are arranged in a cluster pattern on the housing 14*b*. Power is supplied to the assembly 10*b* by a flexible electrical power cord indicated at C and which has a conventional electrical plug P at its free end.

The pocket in the housing 14*b* for receiving the body of the TVSS 12 is located generally adjacent the first receptacle in the series; that is the receptacle to which the power supply cord C is connected.

Other outlet assemblies having housings of differing configurations and employing other receptacle mounting patterns arrangements are possible, and such modified arrangements are contemplated within the scope of the present invention.

We claim:

1. The combination comprising an electrical power outlet assembly and a field replaceable transient voltage surge suppression module connected to said electrical power outlet assembly, said electrical power outlet assembly having a hollow housing, a plurality of electrical outlets mounted on said housing, each of said outlets including a plug receptacle accessible externally of said housing, and circuit means for electrically connecting one of said outlets to a source of electrical power to provide power at each of said outlets, said housing having an opening therein generally adjacent said one of said outlets, said transient voltage surge suppression module having a casing including a casing body and a casing cover connected to said casing body and having an offset portion projecting from said casing body, surge suppressing means contained within said casing body for absorbing and dissipating transient voltage surges, an electrical plug projecting from said casing cover and including a plurality of plugging elements for releasable plugging engagement with said one of said outlets, and conductive means for electrically connecting said surge suppressing means to said electrical plug, said casing body extending into said housing through said opening and being substantially disposed within said housing when said electrical plug is in plugging engagement with said one of said outlets.

2. The combination as set forth in claim 1 including attaching means independent of said electrical plug for releasably securing said transient voltage surge suppression module to said electrical power outlet assembly.

3. The combination as set forth in claim 2 wherein said attaching means comprise a fastener.

4. The combination as set forth in claim 3 wherein said fastener passes through said casing and threadably engages said outlet assembly.

5. The combination as set forth in claim 1 wherein said housing has a pocket therein defining said opening and substantially receiving said casing body therein when said plugging elements are in plugging engagement with said one of said outlets.

6. The combination as set forth in claim 5 wherein said pocket is at least partially defined by said one of said outlets.

7. The combination as set forth in claim 1 wherein said housing comprises a longitudinally elongated raceway and said outlets are arranged in longitudinal series along said raceway.

8. The combination as set forth in claim 1 wherein said outlets are arranged in a cluster on said housing.

9. The combination as set forth in claim 1 wherein said housing is made from a nonmetallic material and said casing is made from a nonmetallic material.

10. The combination as set forth in claim 9 wherein said housing includes a housing base, a housing cover and means for securing said housing cover in assembly with said housing base.

11. The combination as set forth in claim 10 wherein said housing comprises a surface mountable raceway.

12. The combination as set forth in claim 1 including disabling means for preventing said surge suppression module from being plugged into a receptacle with which it is not intended to be used.

13. The combination as set forth in claim 12 wherein said disabling means comprises a blade projecting from said casing and said one of said outlets has a slot receiving said blade therein when said plugging elements are in plugging engagement with said one of said outlets.

14. A transient voltage surge suppression module comprising a casing having a casing body including a front end and a rear end and a casing cover connected to said front end of said casing body and extending laterally outwardly beyond said casing body, an electrical plug projecting rearwardly from said casing cover in laterally offset relation to said casing body, said plug including a plurality of rearwardly projecting plugging elements for electrically connected plugging engagement with an electrical plug receptacle, surge suppressing means disposed within said casing body for absorbing and dissipating transient voltage surges, and electrically conducting means for connecting said surge suppressing means to said plugging elements.

15. A transient voltage surge suppression module as set forth in claim 14 wherein said casing body is generally rectangular and laterally elongated and said casing cover projects laterally outward from and beyond one side of said casing body.

16. A transient voltage surge suppression module as set forth in claim 15 wherein said surge suppressing means includes a printed circuit board and said electrically conducting means comprises circuit traces on said circuit board.

17. A transient voltage surge suppression module as set forth in claim 14 wherein said electrical plug receptacle is further characterized as a designated plug receptacle and said module includes disabling means carried by said module and disposed proximate said plugging elements for preventing said surge suppression module from being electrically connected in plugging engagement with an electrical plug receptacle other than a said designated electrical plug receptacle.

18. A transient voltage surge suppression module as set forth in claim 17 wherein said disabling means comprises a disabling member for abutting engagement with an associated portion of the outer surface of an electrical receptacle other than a said designated electrical receptacle.

19. A transient voltage surge suppression module as set forth in claim 18 wherein said disabling member comprises a blade-like member integrally connected to an projecting rearwardly from said casing.

20. A multi-outlet system comprising an outlet assembly having a hollow dielectric housing including a housing base and a housing cover, a plurality of electrical power outlets mounted on said housing cover, each of said power outlets including a plug receptacle accessible externally of said housing, circuit means for electrically connecting one of said power outlets to a source of electrical power to provide electrical power to each of said power outlets, said housing having a dielectric pocket therein opening outwardly through said housing cover generally adjacent said one of said power outlets, and a field replaceable transient voltage surge suppression module having a dielectric casing including a casing body and a casing cover, and electrical plug rigidly supported relative to and projecting from said casing cover in offset relation to said casing body for absorbing and dissipating transient voltage surges, said electric plug including a plurality of plugging elements for releasable plugging engagement with said one of said power outlets, surge suppressing means contained with said casing body, and a printed circuit board having electrically conductive traces thereon electrically connecting said surge suppressing means and said plugging elements, said casing body being disposed within said pocket when said plugging elements are in plugging engagement with said one of said power outlets.

21. A multi-outlet assembly as set forth in claim 20 wherein said plugging elements are mounted on said circuit board.

22. A multi-outlet system as set forth in claim 21 wherein said casing cover cooperates with said circuit board to provide a substantial enclosure containing said traces.

23. A multi-outlet system as set forth in claim 20 wherein said housing comprises a surface mountable raceway.

24. A multi-outlet system as set forth in claim 20 including attaching means independent of said plugging elements for releasably securing said surge suppression module to said outlet assembly.

25. A multi-outlet system as set forth in claim 20 wherein said outlet assembly comprises a point-of-use assembly and said circuit means includes a flexible electrical supply cord extending from said housing and a plugging connector electrically connected to a free end of said electrical supply cord.

26. A multi-outlet system as set forth in claim 25 wherein said housing comprises a longitudinally elongated housing and said power outlets are arranged in longitudinal series along said housing.

27. A multi-outlet system as set forth in claim 25 wherein said housing comprises a generally rectangular housing and said power outlets are arranged in a cluster pattern on said housing.

28. A transient voltage surge suppression module comprising an elongated circuit board having a front surface and a rear surface, surge suppression means for absorbing and dissipating transient voltage surges and including a plurality of circuit elements supported on said rear surface of said circuit board, plugging means including a plurality of plugging elements mounted on said circuit board and projecting rearwardly from said rear surface in generally normal relation to said rear surface and in laterally spaced relation to said circuit elements for electrically connected plugging engagement with a designated electrical receptacle, and a casing including a casing body and a casing cover, said casing body containing said circuit elements and having an integral laterally outwardly projecting apertured lip overlying a portion of said rear surface of said circuit board, said plugging elements projecting through and rearwardly beyond said apertured lip in laterally spaced relation to said casing body, said cover cooperating with said casing body to enclose said circuit board.

29. A transient voltage surge suppression module as set forth in claim 28 including disabling means carried by said module and disposed proximate said plugging elements for preventing said surge suppression module from being electrically connected in plugging engagement with an electrical plug receptacle other than a said designated electrical plug receptacle.

30. A transient voltage surge suppression module as set forth in claim 29 wherein said disabling means comprises a disabling member for abutting engagement with an associated portion of the outer surface of an electrical receptacle other than a said designated electrical receptacle.

31. A transient voltage surge suppression module as set forth in claim 30 wherein said disabling member comprises a blade-like member integrally connected to and projecting rearwardly from said lip.

32. A transient voltage surge suppression module as set forth in claim 28 wherein said module has a fastener receiving opening therethrough defined by said casing cover, said circuit board and said lip.

33. A transient voltage surge suppression module as set forth in claim 28 having means for indicating the condition of said surge suppression means including an indicator signal lamp mounted on said circuit board and exposed at said front surface of said circuit board and a lens carried by said casing cover and through which said indicator lamp is visible.

* * * * *